United States Patent [19]
Goldberg

[11] Patent Number: 5,802,127
[45] Date of Patent: Sep. 1, 1998

[54] DEVICE FOR PROTECTING IN-CORE MONITORS AGAINST DAMAGE DURING SERVICING OF NUCLEAR REACTOR

[75] Inventor: Neal J. Goldberg, San Jose, Calif.

[73] Assignee: General Electric Company, San Jose, Calif.

[21] Appl. No.: 712,098

[22] Filed: Sep. 11, 1996

[51] Int. Cl.$^6$ .................................................. G21C 17/00
[52] U.S. Cl. ...................... 376/262; 376/254; 376/245; 376/260
[58] Field of Search ..................... 376/262, 254, 376/255, 154, 260, 341–342, 453

[56] References Cited

U.S. PATENT DOCUMENTS

| | | | |
|---|---|---|---|
| 4,318,776 | 3/1982 | Pröll et al. | 376/254 |
| 4,623,508 | 11/1986 | Glesius et al. | 376/254 |
| 4,790,976 | 12/1988 | Zahn et al. | 376/260 |

*Primary Examiner*—Michael J. Carone
*Assistant Examiner*—Matthew J. Lattig
*Attorney, Agent, or Firm*—James E. McGinness; Dennis M. Flaherty

[57] ABSTRACT

An in-core monitor protector intended for use during in-vessel services while work is being performed in the reactor core region of a BWR. The purpose of the protector is to prevent damage to or displacement of the in-core monitors, which could be caused by the installation or removal of various types of equipment through the top guide of the core during an outage. This protection is accomplished by partly surrounding the in-core monitor with the protector. The primary component is an aluminum channel of such size as to surround the monitor on three sides and of such length as to extend from the bottom of the top guide to the top of the fuel support castings. The closed sides of the channel prevent direct contact between servicing tools and the monitor. A top subassembly is used to secure the protector to the top guide. A bottom subassembly is used to secure the protector to the fuel support castings.

8 Claims, 8 Drawing Sheets

DEVICE FOR PROTECTING IN-CORE MONITORS AGAINST DAMAGE DURING SERVICING OF NUCLEAR REACTOR

FIELD OF THE INVENTION

This invention generally relates to the maintenance or repair of a boiling water reactor. In particular, the invention relates to devices for protecting sensitive instrumentation from damage during the performance of in-vessel services in the reactor core region.

BACKGROUND OF THE INVENTION

As seen in FIG. 1, a conventional boiling water reactor has a reactor pressure vessel 10 and a core shroud 12 arranged concentrically in the reactor pressure vessel with an annular region, namely, the downcomer annulus 14, therebetween. The core shroud 12 is a stainless steel cylinder surrounding the nuclear fuel core. In particular, the core shroud 12 comprises a shroud head flange 12a for supporting the shroud head (not shown); a circular cylindrical upper shroud wall 12b having a top end welded to shroud head flange 12a; an annular top guide support ring 12c welded to the bottom end of upper shroud wall 12b; a circular cylindrical middle shroud wall welded assembly 12d welded to the top guide support ring 12c; and an annular core plate support ring 12e welded to the bottom of the middle shroud wall 12d and to the top of a lower shroud wall 12f. As seen in FIG. 1, the shroud 12 is vertically supported by a plurality of shroud support legs 16, each of the latter being welded to the bottom head of the reactor pressure vessel 10. The shroud is laterally supported by an annular shroud support plate 18, which is welded at its inner diameter to the shroud 12 and at its outer diameter to the reactor pressure vessel 10. The shroud support plate 18 has a plurality of circular apertures 20 in flow communication with the diffusers of a plurality of jet pump assemblies (not shown).

The fuel core of a BWR consists of a multiplicity of upright and parallel fuel bundle assemblies 22 arranged in 2×2 arrays, each assembly consisting of an array of fuel rods inside a fuel channel made of zirconium-based alloy. Each array of fuel bundle assemblies is laterally supported at the top by a top guide 24 and at the bottom by a core plate 26. The top guide 24 maintains the correct fuel channel spacing to permit control rod insertion. The top guide 24 is designed so that during periodic refueling operations, the fuel bundle assemblies 22 can be lifted out of and lowered into the core without removing the top guide. One type of top guide installed in certain types of BWRs has a fabricated design comprising a lattice of interlocking upper and lower beams held together by a large circular ring. The circular ring of the top guide sits on the top guide support ring 12c of the shroud 12, and is provided with radially inwardly directed flanges that capture the distal ends of the beams. The core plate 26 is bolted to and supported by the core plate support ring 12e.

The lateral support provided by the top guide and the core plate maintain the correct fuel channel spacing (see FIG. 3) to permit vertical travel of a cruciform control rod blade 28 therebetween. The power level of the reactor is maintained or adjusted by positioning the control rods 28 up and down within the core while the fuel bundle assemblies 22 are held stationary. Each control rod 28 has a cruciform cross section consisting of four wings at right angles. Each wing consists of a multiplicity of parallel tubes welded in a row, each tube containing stacked capsules filled with neutron-absorbing material.

Referring to FIG. 1, each control rod is raised or lowered inside a control rod guide tube 30 by a control rod drive (not shown) which is releasably coupled to a socket in the bottom of the control rod. Each control rod drive is mounted vertically in a control rod drive housing 32 which is welded to a stub tube 34, which in turn is welded to the bottom head of the reactor pressure vessel 10. The control rod drive is a double-acting, mechanically latched hydraulic cylinder. The control rod drive is capable of inserting or withdrawing a control rod (not shown) at a slow controlled rate for normal reactor operation and of providing rapid control rod insertion (scram) in the event of an emergency requiring rapid shutdown of the reactor.

The control rod drive housing 32 has an upper flange that bolts to a lower flange of the guide tube 30. Each guide tube 30 sits on top of and is vertically supported by its associated control rod drive housing 32. The uppermost portion of the guide tube penetrates a corresponding circular aperture in the core plate 26. There are typically 140 guide tubes penetrating an equal number of circular apertures in the core plate 26, each aperture having a diameter slightly greater than the outer diameter of the guide tube.

Referring to FIG. 2, a fuel support casting 38 sits on top of the guide tube 30 and has a 2×2 square array of openings 102 (only one of which is partly shown in FIG. 2). The upper end of each opening 102 is formed with a chamfered seat 38a. Each chamfered seat supports a respective fuel bundle assembly. The fuel support casting also has a cruciform opening for passage of the control rod blade between the fuel bundle assemblies of a 2×2 array.

The bottom piece 104 of each fuel bundle assembly is configured with a portion 104a that enters the corresponding opening 102, a portion having a conical surface 104b which bears against the chamfered seat 38a, a portion 104c around which the fuel channel 106 is fitted, and an apertured portion 104d having an array (e.g., 8×8 or 9×9) of apertures 108. Each aperture 108 receives the tip of a bottom end plug 110 of a respective one of the fuel rods 112 making up the fuel bundle assembly.

As seen in FIG. 2, the fuel support casting 38 further comprises a portion having a conical surface 38b which bears against a chamfered seat 30c formed at the top edge of the guide tube 30. The guide tube also has a machined step 30a which extends radially outward a distance equal to about 30 mils. A pair of lugs (only one of which is indicated by reference 30b in FIG. 2) are welded to the machined step at diametrally opposite positions. These lugs extend radially outward in opposite directions. The guide tube lug 30b has a slot 46 of width slightly greater than the diameter of a vertical alignment pin 36 mounted on the core plate 26. During installation, the guide tube 30 must be rotated until the lug slot lines up with the alignment pin 36. The lower edge of slot 46 has a chamfer 46a and the tip 36a of pin 36 is conical to facilitate entry of the pin into the slot as the guide tube is lowered. Similarly, the fuel support casting 38 has a slot 38c which aligns with pin 36.

After the fuel support casting 38 is in place, four fuel bundle assemblies 22 are lowered through a square opening in the top guide and onto respective chamfered seats 38a of the fuel support casting 38. During reactor operation, water flows upwardly through openings 102 in the fuel support casting and then upwardly through the fuel channels 106. The water flowing between the fuel rods acts as both a coolant for removing heat and a moderator for stopping neutrons.

The top guide 24 provides lateral support for the in-core monitoring instrumentation, which includes the local power range monitors (LPRMs) and the source range monitors (SRMs). The purpose of the LPRM system is to continuously monitor local thermal neutron flux within the core from 0 to 125% of rated power. The LPRM signal is used by the rod block monitor system, the average power range monitor system, the computer flux profile programs, and annunciator circuits to ensure protection of the fuel cladding and to aid the operator in evaluating the nuclear and thermal hydraulic performance of the reactor core. The LPRM system consists of fixed in-core neutron detectors of the fission chamber type. One known LPRM system comprises a total of 164 detectors arranged in 41 strings distributed radially throughout the core, each string having four detectors distributed axially. FIG. 3 shows the placement of an LPRM string 40 in the narrow water gap 42 not occupied by a control rod.

Referring to FIG. 4, each detector string consists of a stainless steel tube 44 approximately 42 feet long which houses the four LPRM detectors 45a–45d and a traversing in-core probe (TIP) tube 48 which houses the detector cables (not shown). Holes (not shown) fabricated in the LPRM tube allow reactor coolant flow to remove detector heat. Detectors 45a–45d are arranged vertically at 3-foot intervals beginning 18 inches above the bottom core plate 26. Each detector cable ends below the reactor pressure vessel 10 (shown standing on a pedestal 50 in FIG. 4) and fits into a connector assembly (not shown). A coaxial cable connects the detector string through the primary containment penetration (not shown) to the respective power range monitoring cabinet in the control room. Each LPRM detector is a miniature fission chamber which provides an output signal to its signal conditioning equipment resulting from fissions within the chamber. The TIP system comprises a movable fission chamber detector which can be placed alongside any LPRM detector 45a–45d in the core. The TIP detector, when positioned, provides a reading by which the LPRM detector can be calibrated to or verified against.

The SRM detectors are similar in construction to the LPRM detectors. The purpose of the SRN system is to monitor core neutron flux levels during shutdown conditions, during refueling operations and during startup until the intermediate range monitors are firmly on scale.

Referring to FIG. 4, the LPRM tube 44 is inserted into the fuel core from above and then through the in-core monitor guide tube 52, the top of which is attached in a hole 88 in the core plate 26. The bottom of the in-core monitor guide tube 52 is connected to the top of an in-core monitor housing 54 by a weldment W. Each in-core monitor housing 54 extends upwardly through the bottom head 10a and into the interior of RPV 10. Motion of the LPRM tube 44 below the core region is guided vertically by the in-core monitor guide tube 52. The LPRM tube 44 extends upward through the core region to the top guide 24. The top of the LPRM tube 44 is provided with a spring plunger (not shown) which deflects about one inch axially. This axial deflection allows the spring plunger to pass under the intersection of two top guide beams and then expand into a recess formed by slots 56 in each of the two beams, thereby laterally locking the top of the LPRM tube 44 in place. In this position, tube 44 is located in a water gap 42 between fuel bundle assemblies (see FIG. 3) and is laterally supported in the core region by the fuels channels of those fuel bundle assemblies. Therefore, no guide tube is needed in the core region.

During in-vessel services when large or bulky servicing equipment is installed and removed inside the core region of a BWR, there exists the potential for damage to occur to the in-core monitor instruments. Servicing tooling can collide with these unprotected instruments. Thus, there is a need for a device to mitigate the potential for damage. In particular, there is a need for a device which can provide a layer of protection between the instruments and the tooling during installation, operation, and removal.

SUMMARY OF THE INVENTION

The present invention is an in-core instrumentation protector intended for use during in-vessel services while work is being performed in the reactor core region of a BWR. The purpose of the protector is to prevent damage to or displacement of the in-core instruments, such as the LPRM or SRM, which could be caused by the installation or removal of various types of equipment through the top guide of the core during an outage. This protection is accomplished by partly surrounding the in-core instrument with the protector. The device of the invention provides adequate protection from moderate forces, ease of rapid installation and removal, and self-securing linkages to the top guide and core plate. It uses a minimal amount of the available space in the installation top guide cell, and incorporates features which prevent the intrusion of debris into the bottom head region via openings in the fuel support casting.

In accordance with the preferred embodiment of the protector, the primary component consists of an aluminum channel of such size as to surround the LPRM or SRM on three sides and of such length as to extend from the bottom of the top guide to the top of the fuel support castings. The closed sides of the channel prevent direct contact between servicing tools and the LPRM or SRM. The open side of the channel extends beyond the outer diameter of the LPRM or SRM to provide protection on that side while retaining ease of installation and removal.

In accordance with further features of the preferred embodiment, a top subassembly is used to secure the protector to the top guide and a bottom subassembly is used to secure the protector to the fuel support castings. The protector is designed to minimize the intrusion into the installation cell in the top guide. This allows for additional large tools to be installed through that top guide cell. The bottom subassembly is designed to accommodate variability in the lateral location of the fuel support castings while still providing a means to anchor the lower portion of the protector.

DETAILED DESCRIPTION OF THE PREFERRED EMBODIMENT

Figure 1:
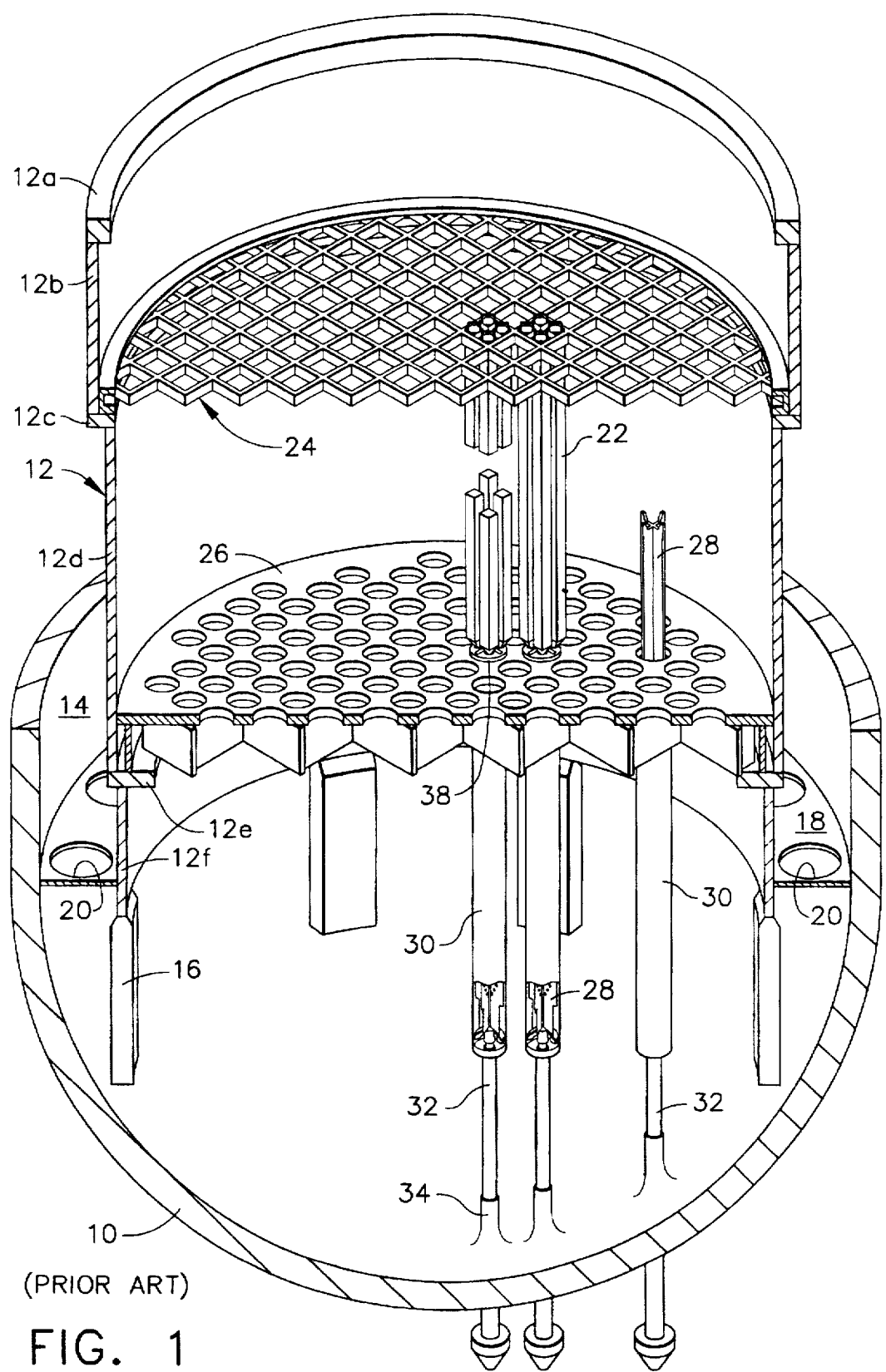
FIG. 1 is a schematic diagram showing an isometric view of portions of a typical BWR having a core plate and a top guide for laterally supporting a multiplicity of fuel bundle assemblies.
Figure 2:
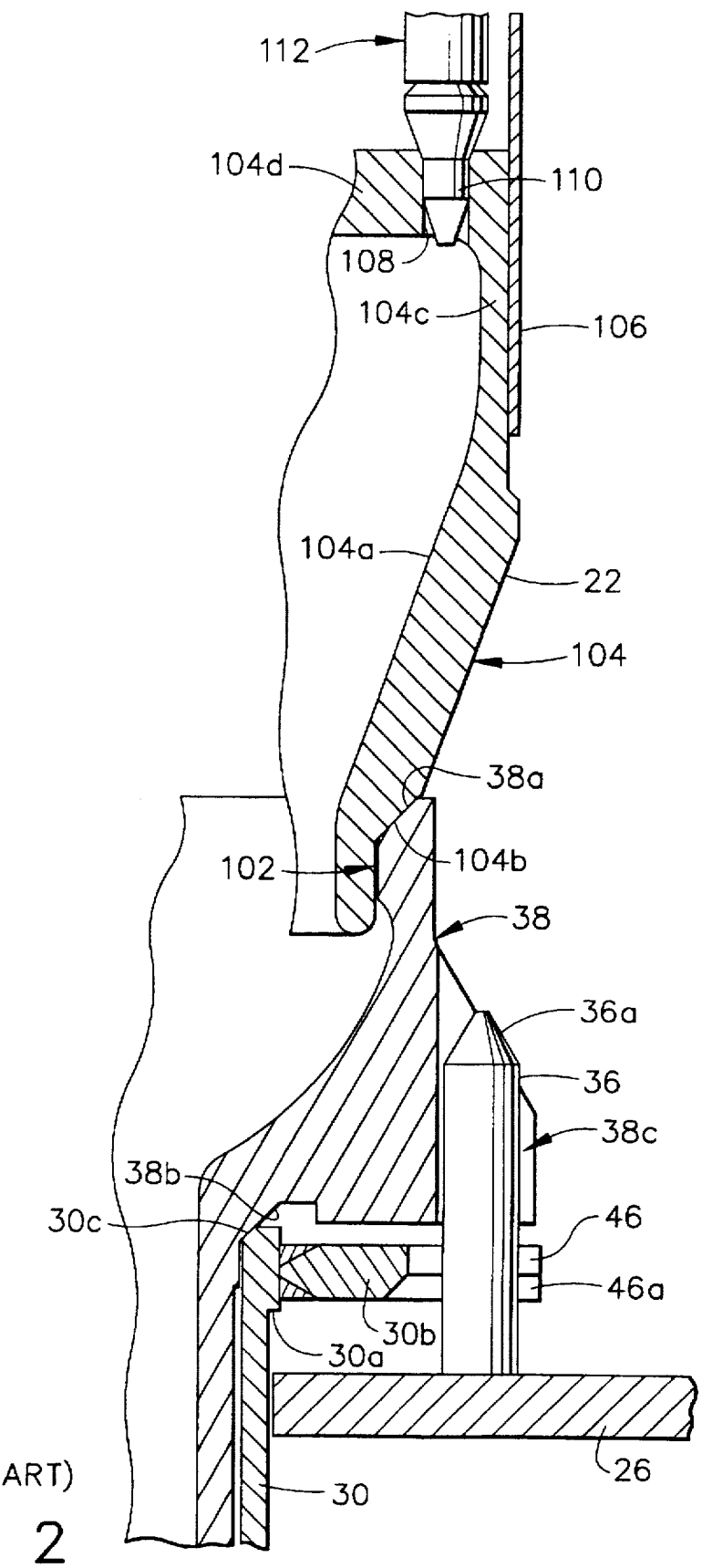
FIG. 2 is a schematic diagram showing a sectional view of the top of the guide tube and portions of the components vertically supported thereby in a BWR of the type shown in FIG. 1.
Figure 3:
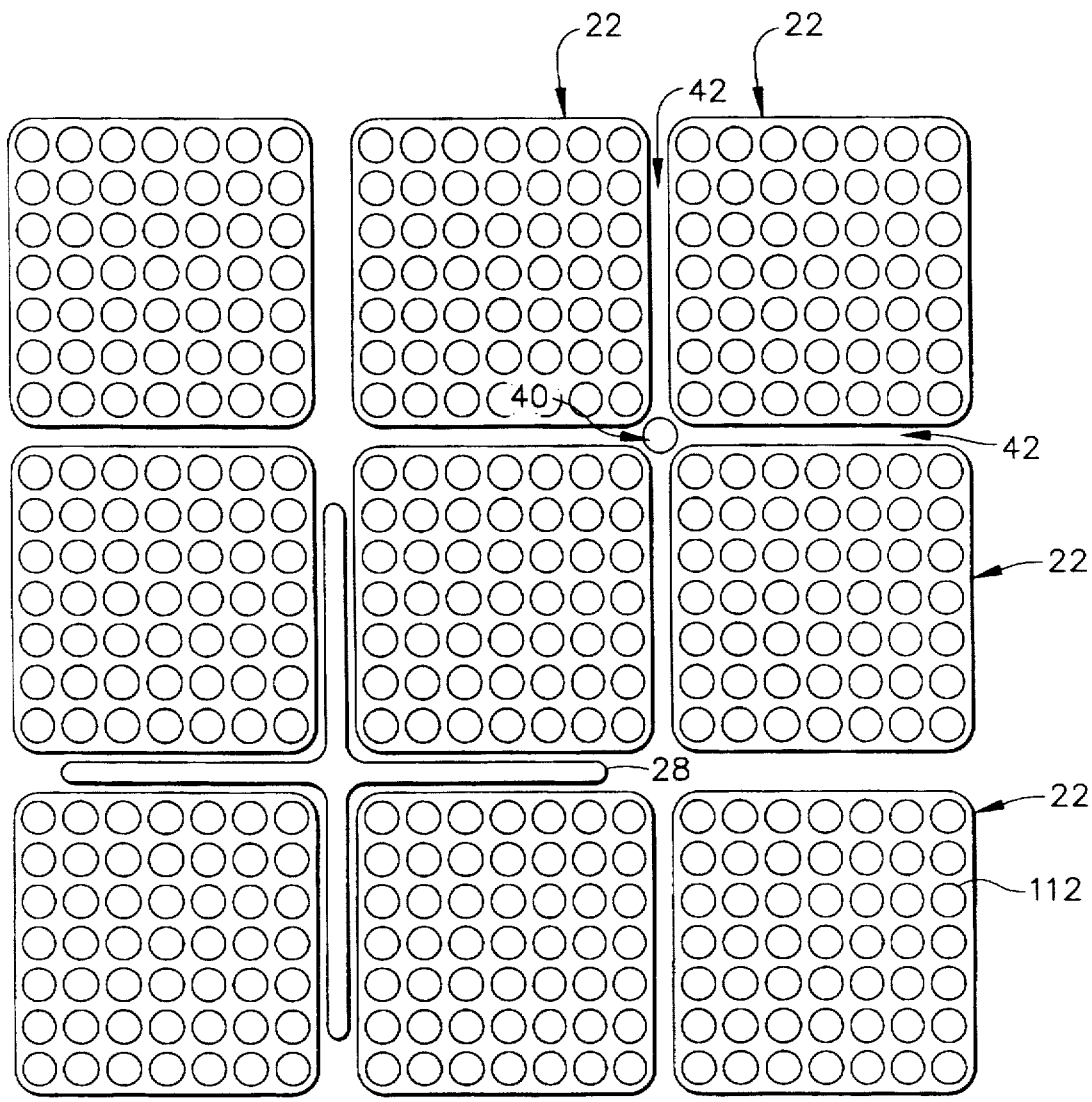
FIG. 3 is a schematic diagram showing a plan view of an LPRM detector assembly located in an array of fuel bundle assemblies in a BWR of the type shown in FIG. 1.
Figure 4:
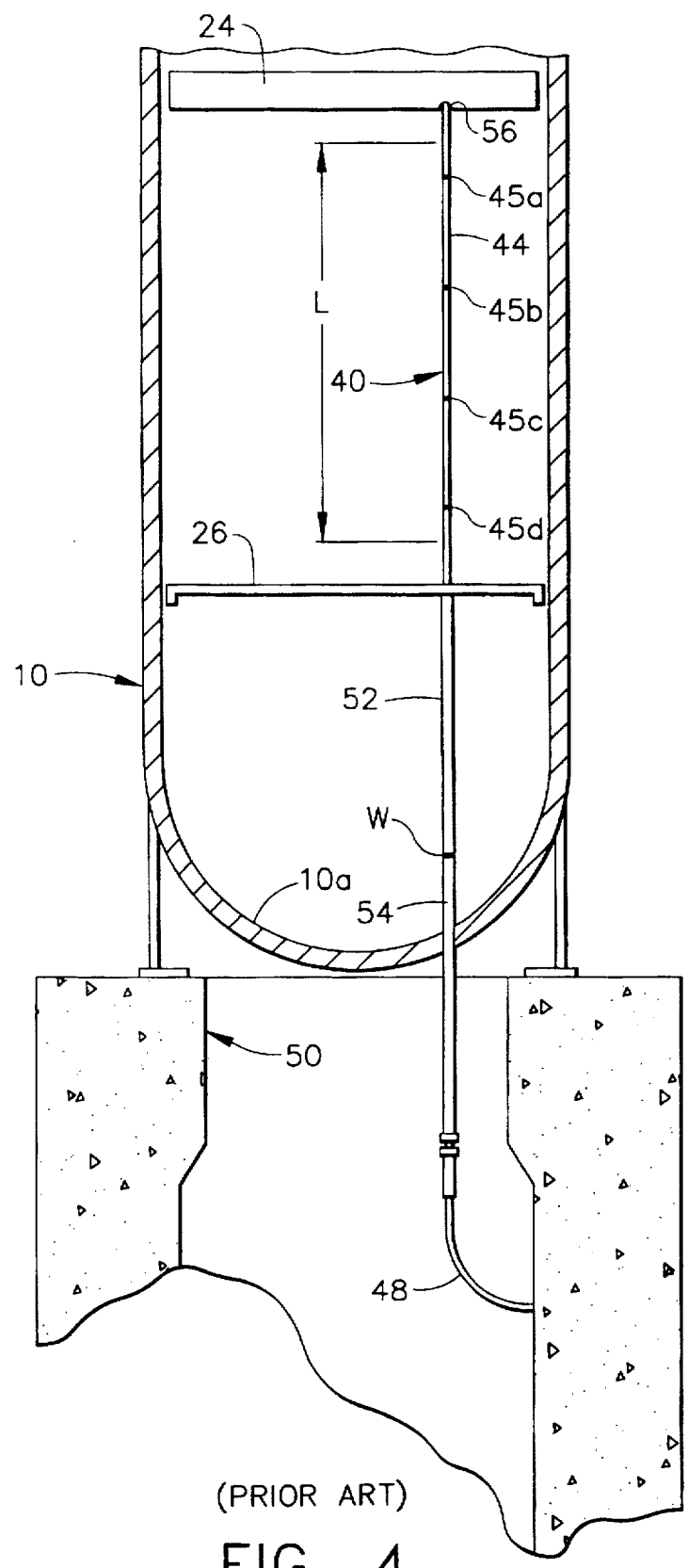
FIG. 4 is a schematic diagram showing an elevational view of an LPRM detector assembly in a BWR of the type shown in FIG. 1.
Figure 5:
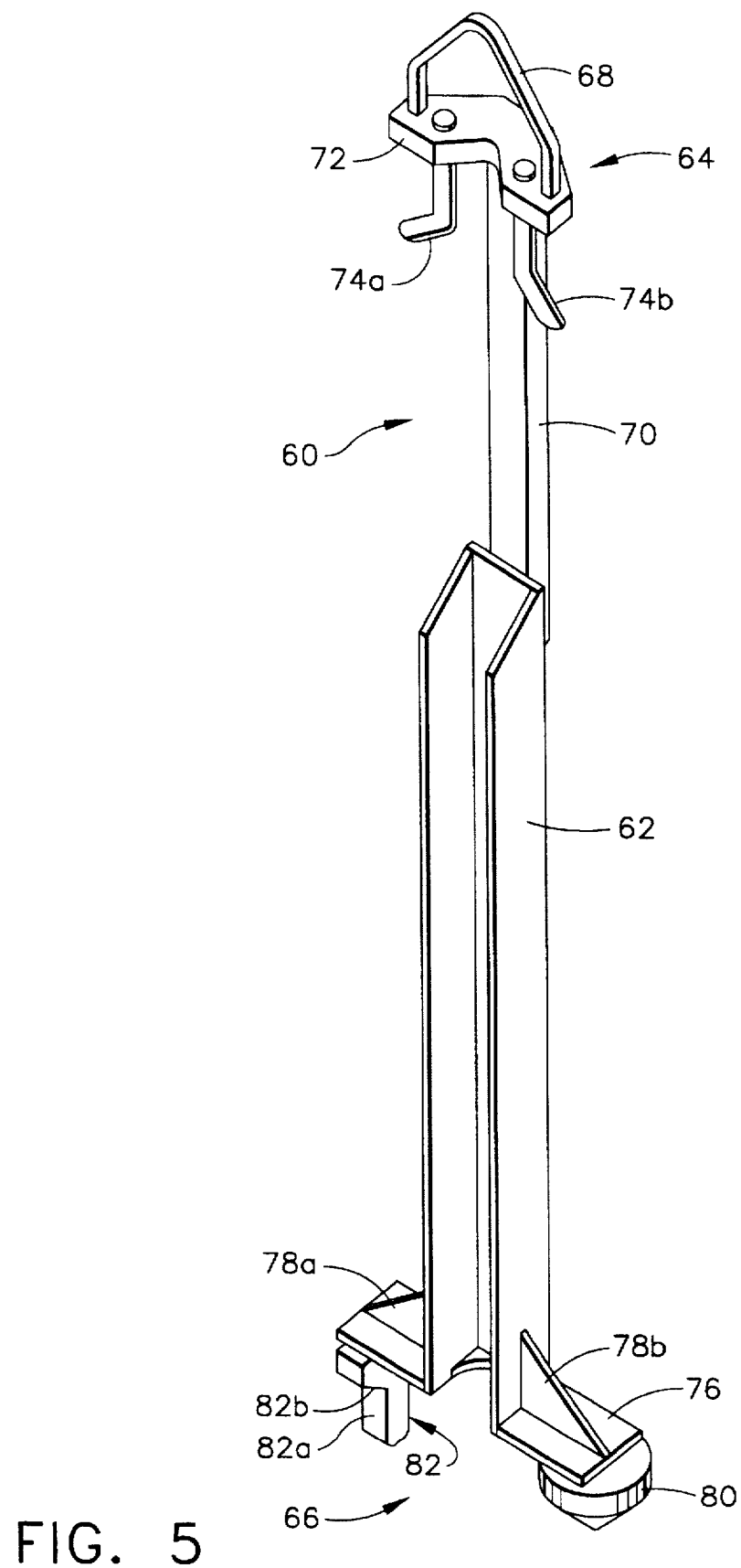
FIG. 5 is a schematic diagram showing an isometric view of the in-core monitor protector in accordance with the preferred embodiment of the invention.
Figure 6A:
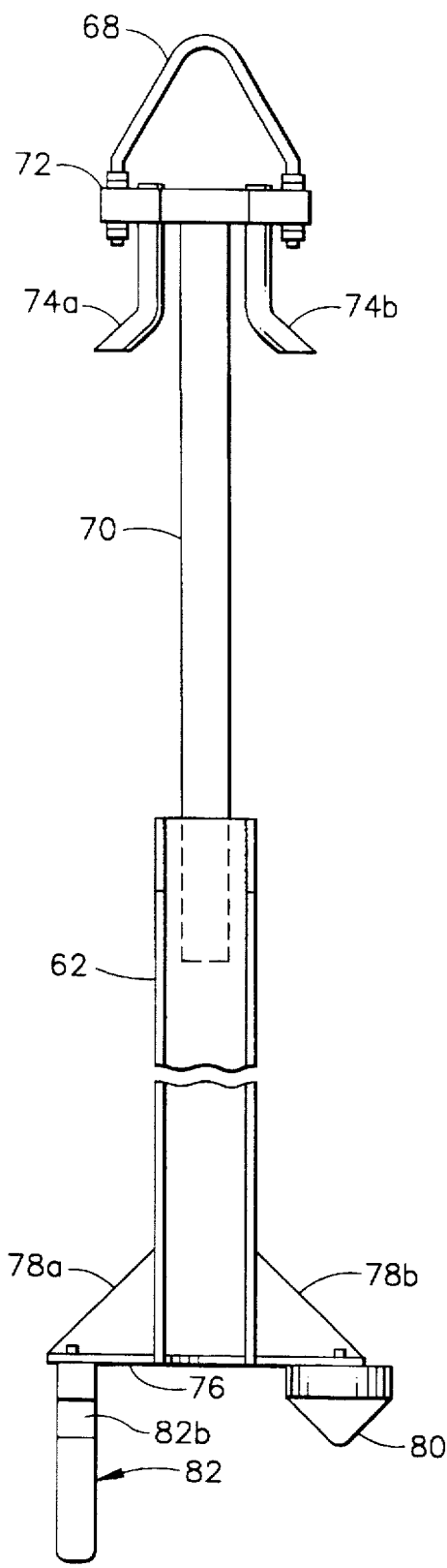
FIGS. 6A and 6B are schematic diagrams showing front and side views, respectively, of the in-core monitor protector shown in FIG. 5.
Figure 6B:
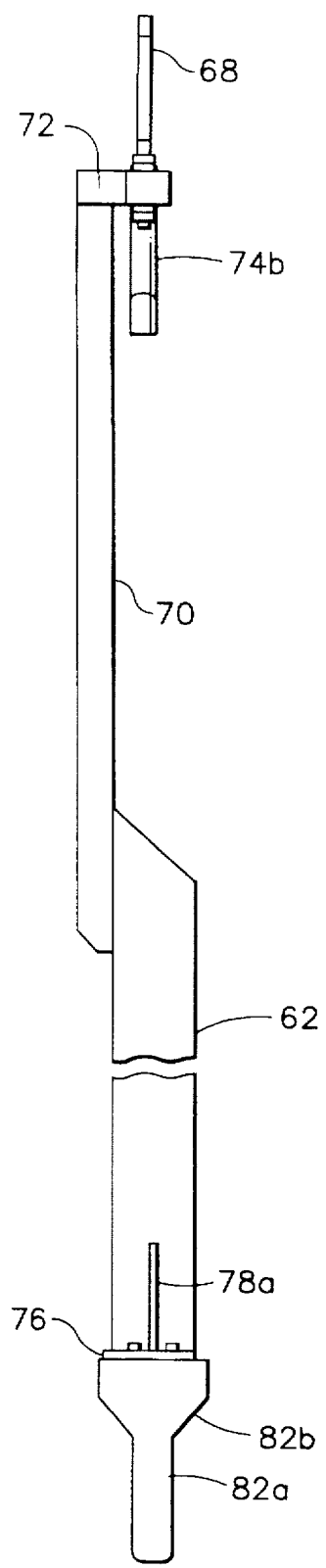

Referring to FIGS. 5, 6A and 6B, the preferred embodiment of the in-core monitor protector 60 comprises an aluminum channel 62, a top subassembly 64 attached to the top of channel 62, a bottom subassembly 66 attached to the bottom of channel 62, and a handle 68 attached to the top subassembly 64.

Figure 7:
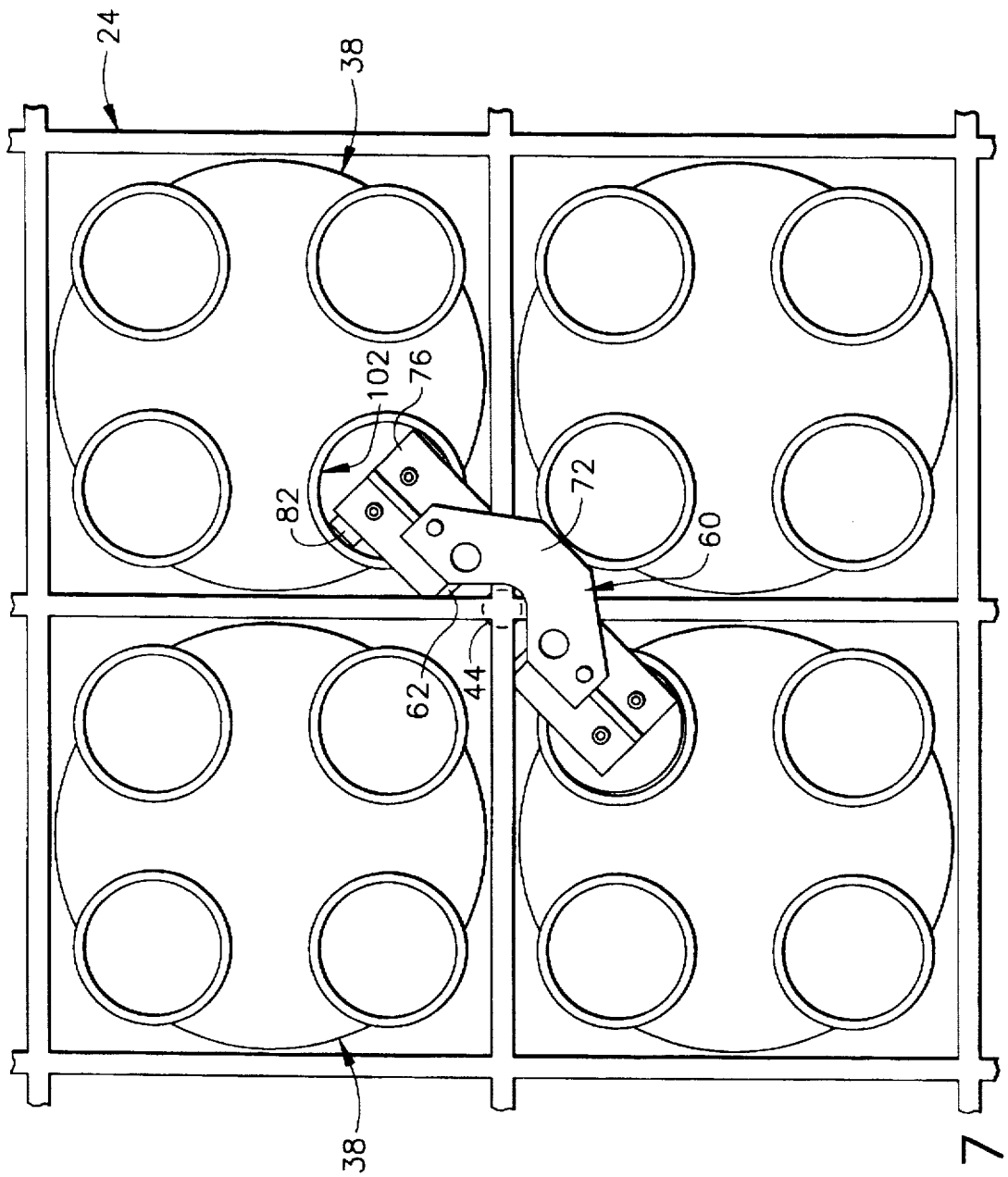
FIG. 7 is a schematic diagram showing a plan view of an installed in-core monitor protector in accordance with the preferred embodiment of the invention.

As best seen in FIG. 7, the channel 62 is of such size as to surround the LPRM tube 44 on three sides. The length of channel 62 is such that it extends from the bottom of the top guide 24 to the top of the fuel support casting 38. The closed sides of the channel prevent direct contact between servicing tools and the LPRM or SRM tube. The channel walls are designed to be thick enough to rigidly withstand moderate impacts, while also allowing or a degree of flexibility and bending in the channel material before the channel contacts the LPRM or SRM surface. The open side of the channel extends beyond the outer diameter of the LPRM or SRM tube to provide protection on that side while retaining ease of installation and removal.

In accordance with a further feature of the preferred embodiment, the top subassembly 64 is used to secure the protector 60 to the top guide 24. The top subassembly 64 comprises: a riser bar 70 which is used to span the top guide 24 and is attached to the back side of the channel 62; a V-bar 72 which rests on the top of the top guide 24 and is attached to the top of the riser bar 70; and two clamp bars 74a, 74b which hook over the top of the top guide cell and are attached to the V-bar 72. The riser bar 70 and V-bar 72 are designed to minimize the intrusion into the installation cell in the top guide 24. This allows for additional large tools to be installed through that top guide cell. As best seen in FIG. 6B, the riser bar 70 must be laterally displaced from the space surrounded by the channel 62, so that the riser bar will not be obstructed by either the LPRM tube or the intersecting top guide beams restraining the top of the LPRM tube. Also, the clamp bars 74a, 74b are flared in opposite directions in order to ease installation by creating leading edges which help to guide the protector into the proper seating location.

Figure 8:
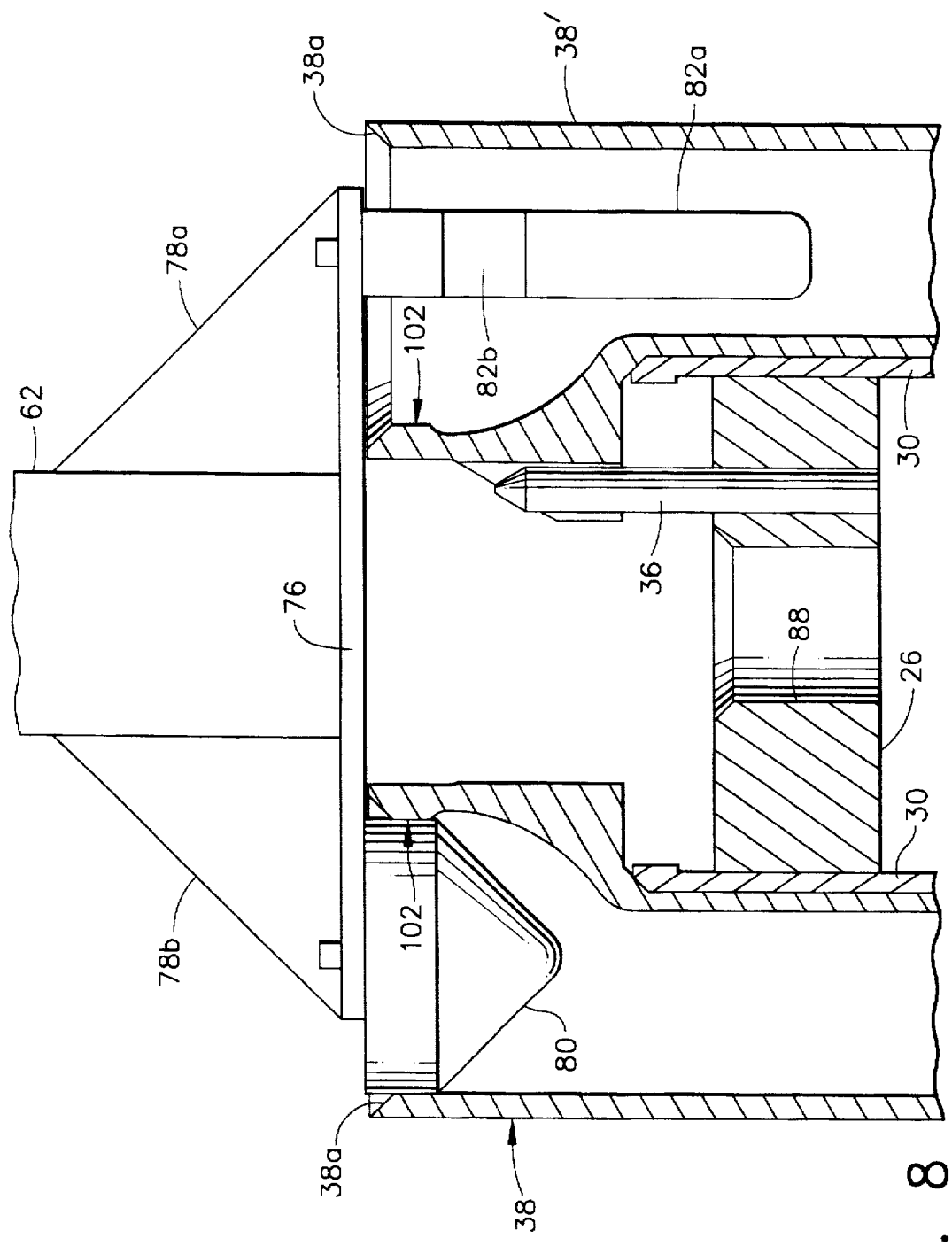
FIG. 8 is a schematic diagram showing an elevational view of the base portion of an installed in-core monitor protector in accordance with the preferred embodiment of the invention.

In accordance with another feature, the bottom subassembly 66 is used to secure the protector 60 to the fuel support castings 38. The bottom subassembly 66 comprises: a base bar 76 which is attached to the bottom of the channel 62; a pair of gussets 78a, 78b which are used to strengthen the joint between the channel 62 and the base bar 76; a round nosepiece 80 which engages one cell or opening 102 of a fuel support casting 38; and a square nosepiece 82 which engages a cell or opening 102 in an adjacent fuel support casting 38' (see FIG. 8). The lengths of the round and square nosepieces are designed to engage the fuel support castings 38, 38' prior to the clamp bars 74a, 74b engaging the top guide 24, which feature aids in installation and removal. Preferably, the round nosepiece 80 has a generally conical bearing surface having an axis generally parallel to a longitudinal axis of the channel 62. Further, the square nosepiece 82 is designed to accommodate variability in the lateral location of the fuel support castings 38 while still providing a means to anchor the lower portion of the protector 60. This is accomplished by a square nosepiece comprising a thick plate having a profile (best seen in FIG. 6B) in which a vertical member 82a having a square cross section extends downward from the apex of a generally triangular member 82b. The square nosepiece lies in a plane which is generally perpendicular to the plane of the central wall of the channel 62. The generally triangular member 82b is an upside-down isosceles triangle, the sides 86 of which form a generally right angle. These tapered sides 86 seat in one cell of the fuel support casting 38', shown in FIG. 8. The square vertical member 82a extends below the elevation of the apex of the conical nosepiece 80 and is used to align the nosepiece 82 with the opening in the corresponding fuel support casting. Once the square vertical member has penetrated the opening in fuel support casting 38, the protector 60 can be rotated to align the conical nosepiece 82 with the opening in the adjacent fuel support casting 38'.

In accordance with yet another feature of the preferred embodiment, a handle 68 is attached to the V-bar 72 and is used during installation and removal to respectively lower and raise the protector into position. The handle 68 is tapered such that the grappling device (not shown) used during installation will be self-centering, thereby easing installation and removal In the installed position, the coupling of the nosepieces 80 and 82 with the fuel support castings 38, 38' limits lateral displacement of the bottom subassembly 66 of the protector 60, while the coupling of the clamp bars 74a, 74b and riser bar 70 with the top guide 24 limits lateral displacement of the top subassembly 64 of the protector 60. In accordance with the present invention, the protector is not positively locked against vertically upward displacement, being held down instead only by the force of gravity.

The preferred embodiment of the in-core monitor protector has been disclosed for the purpose of illustration. Variations and modifications of the disclosed structure which do not depart from the concept of this invention will be readily apparent to engineers skilled in the design of tooling. All such variations and modifications are intended to be encompassed by the claims set forth hereinafter.

I claim:

1. A device for protecting an in-core monitor tube, comprising:

a channel having a top end and a bottom end;

a support member having a top end and a bottom end, said bottom end of said support member being connected to said top end of said channel;

a hooking subassembly connected to said top end of said support member; and a nosepiece assembly connected to said bottom end of said channel, wherein said nosepiece assembly comprises first and second nosepieces, said first nosepiece being laterally spaced from said second nosepiece.

2. The device as defined in claim 1, wherein said first nosepiece has a generally conical bearing surface having an axis generally parallel to a longitudinal axis of said channel.

3. The device as defined in claim 2, wherein said second nosepiece is a thick plate having a pair of tapered bearing surfaces on opposite sides thereof.

4. The device as defined in claim 1, wherein said hooking subassembly comprises first and second clamp bars lying in a plane which does not intersect said support member.

5. The device as defined in claim 4, wherein each of said first and second clamp bars comprises a first portion which lies generally parallel to a longitudinal axis of said channel and a second portion which lies not parallel to said longitudinal axis of said channel.

6. The device as defined in claim 5, wherein said second portions of said first and second clamp bars extend in opposite directions.

7. The device as defined in claim 1, further comprising a handle connected to said hooking subassembly.

8. The device as defined in claim 1, wherein said channel comprises mutually parallel first and second side walls connected to a central wall lying perpendicular to said first and second side walls, and said support member comprises a straight beam attached to a rear surface of said central wall of said channel, said straight beam having a longitudinal axis which lies generally parallel to a longitudinal axis of said channel.

* * * * *